US012580268B2

(12) United States Patent
Yang et al.

(10) Patent No.: US 12,580,268 B2
(45) Date of Patent: Mar. 17, 2026

(54) BATTERY ASSEMBLY

(71) Applicants:Hyundai Motor Company, Seoul (KR); Kia Corporation, Seoul (KR); YURA CORPORATION CO., LTD., Seongnam-si (KR)

(72) Inventors: Hee Gun Yang, Anyang-si (KR); Kang Woo Bae, Suwon-si (KR); Chan Young Jung, Yongin-si (KR); Do Hoon Yeo, Gunpo-si (KR)

(73) Assignees: Hyundai Motor Company, Seoul (KR); Kia Corporation, Seoul (KR); YURA CORPORATION CO., LTD., Seongnam-si (KR)

( * ) Notice: Subject to any disclaimer, the term of this patent is extended or adjusted under 35 U.S.C. 154(b) by 525 days.

(21) Appl. No.: 18/142,285

(22) Filed: May 2, 2023

(65) Prior Publication Data

US 2024/0128579 A1    Apr. 18, 2024

(30) Foreign Application Priority Data

Oct. 13, 2022    (KR) ......................... 10-2022-0131744

(51) Int. Cl.
| | |
|---|---|
| *H01M 50/271* | (2021.01) |
| *H01M 10/65* | (2014.01) |
| *H01M 50/262* | (2021.01) |

(52) U.S. Cl.
CPC ......... H01M 50/271 (2021.01); H01M 10/65 (2015.04); H01M 50/262 (2021.01)

(58) Field of Classification Search
CPC ............. H01M 50/271; H01M 50/282; H01M 50/262; H01M 50/284; H01M 50/287; H01M 50/289; H01M 50/291
See application file for complete search history.

(56) References Cited

U.S. PATENT DOCUMENTS

| | | | |
|---|---|---|---|
| 10,752,121 B2 | 8/2020 | Yu et al. | |
| 2018/0034012 A1* | 2/2018 | Yu ........................ | H01M 50/249 |
| 2022/0393293 A1* | 12/2022 | Park .................... | H01M 50/271 |

FOREIGN PATENT DOCUMENTS

| | | |
|---|---|---|
| KR | 10-2017-0025524 A | 3/2017 |
| KR | 10-2018-0091325 A | 8/2018 |

* cited by examiner

*Primary Examiner* — Christopher P Domone
(74) *Attorney, Agent, or Firm* — MORGAN, LEWIS & BOCKIUS LLP

(57) ABSTRACT

A battery assembly includes a battery module stack in which at least one battery module is stacked and formed, a cover portion coupled to a side of the battery module stack, and a substrate portion coupled to an external surface of the cover portion, wherein the cover portion includes a cover member coupled to the battery module stack, and a protrusion member protruding in an outward direction from the cover member and in contact with an internal surface of the substrate portion, the substrate portion includes an overlapping region which is a region overlapping the protrusion member when viewed in the outward direction, a through-hole passing through the overlapping region in the outward direction is formed in the overlapping region, and a pad region having electrically conductive properties is formed in a region surrounding the through-hole in the substrate portion.

12 Claims, 6 Drawing Sheets

BATTERY ASSEMBLY

CROSS-REFERENCE TO RELATED APPLICATION

The present application claims priority to Korean Patent Application No. 10-2022-0131744, filed on Oct. 13, 2022, the entire contents of which is incorporated herein for all purposes by this reference.

BACKGROUND OF THE PRESENT DISCLOSURE

Field of the Present Disclosure

The present disclosure relates to a battery assembly.

Description of Related Art

Because accidents such as battery ignition due to over-charging or sudden impact of a battery may lead to major accidents, in general, a battery pack in which a battery module is assembled is provided with components for safe operation of the batter pack.

Examples of the components for safe operation may include a latch relay for preventing overcharging of the battery, a thermal management device for managing heat inside the battery pack, and the like. These components may be controlled through a substrate portion coupled to the battery pack.

FIG. 1 is a view illustrating a battery assembly according to the related art. FIG. 2 is a view illustrating a side of the substrate part in the battery assembly according to the related art. As illustrated in FIG. 2, generally, as a surface mounted technology (SMT)-type bus bar terminal block 2 is applied to the substrate part 1, a ring terminal wire or the like connected to a latch relay bus bar and a thermal manager is connected to the substrate part 1. As illustrated in FIG. 2, the bus bar terminal block 2 protruding outward corresponds to a method for promoting workability in a process by making it easier to fasten the bus bar, the ring terminal wire, or the like to the substrate part 1 during the process.

However, generally, because the bus bar terminal block 2 protruding outward is provided, a shape is relatively likely to change due to an impact or the like.

Furthermore, generally, because a separate bus bar terminal block 2 may be applied, the separate bus bar terminal block 2 causes an increase in the price of raw materials and serves as factors causing cost increase.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a battery assembly including reinforced structural stability.

Another aspect of the present disclosure provides a battery assembly in which the production cost may be reduced.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, there is provided a battery assembly including a battery module stack in which at least one battery module is stacked and formed, a cover portion coupled to a side of the battery module stack, and a substrate portion coupled to an external surface of the cover portion, wherein the cover portion includes a cover member coupled to the battery module stack, and a protrusion member protruding in an outward direction from the cover member and in contact with an internal surface of the substrate portion, the substrate portion includes an overlapping region which is a region overlapping the protrusion member when viewed in the outward direction, a through-hole passing through the overlapping region in the outward direction is formed in the overlapping region, and a pad region having electrically conductive properties is formed in a region surrounding the through-hole in the substrate portion.

In another aspect, the battery assembly may further include a substrate cover portion coupled to an external side of the substrate portion, and a latch relay coupled to an external side of the substrate cover portion.

In yet another aspect, the battery assembly may further include a latch relay input bus bar electrically connected to the latch relay, wherein the overlapping region may include a first overlapping region to be connected to the latch relay, a first through-hole passing through the first overlapping region in the outward direction may be formed in the first overlapping region, and a first pad region in contact with the latch relay input bus bar may be formed in a region surrounding the first through-hole in the substrate portion.

In yet another aspect, a first connection hole communicating with the first through-hole may be formed in a portion overlapping the first overlapping region in the latch relay input bus bar, when viewed in the outward direction, a first opening communicating with the first through-hole and opened in the outward direction may be formed in a first protrusion member overlapping the first overlapping region in the protrusion member, and the battery assembly may further include a first fastening member passing through the first connection hole and the first through-hole and inserted into the first opening to fasten the latch relay input bus bar, the substrate portion, and the cover portion to each other.

In yet another aspect, a first groove passing through a portion overlapping the first pad region in the substrate cover portion in the outward direction and exposing the first pad region in the outward direction may be formed in the substrate cover portion, when viewed in the outward direction thereof.

In yet another aspect, the battery assembly may further include a ground portion that grounds the substrate portion, wherein the overlapping region may include a second overlapping region to be electrically connected to the ground portion, a second through-hole passing through the second overlapping region in the outward direction may be formed in the second overlapping region, and a second pad region in contact with the ground portion may be formed in a region surrounding the second through-hole in the substrate portion.

In yet another aspect, a second connection hole communicating with the second through-hole may be formed in a portion overlapping the second overlapping region in the ground portion when viewed in the outward direction, a second opening communicating with the second through-hole and opened in the outward direction may be formed in a second protrusion member overlapping the second overlapping region in the protrusion member, and the battery assembly may further include a second fastening member passing through the second connection hole and the second through-hole and inserted into the second opening to fasten the ground portion, the substrate portion, and the cover portion to each other.

In yet another aspect, the battery assembly may further include a thermal manager which is electrically connected to the battery module and manages heat of the battery module, wherein the overlapping region may include a third overlapping region to be connected to a positive electrode terminal of the thermal manager, and a fourth overlapping region to be connected to a negative electrode terminal of the terminal manager, a third through-hole passing through the third overlapping region in the outward direction may be formed in the third overlapping region, a fourth through-hole passing through the fourth overlapping region in the outward direction may be formed in the fourth overlapping region, a third pad region may be formed in a region surrounding the third through-hole of the substrate portion, and a fourth pad region may be formed in a region surrounding the fourth through-hole of the substrate portion.

In yet another aspect, the battery assembly may further include a substrate cover portion coupled to an external side of the substrate portion, wherein the substrate cover portion may include a second groove that passes through a portion overlapping the third pad region in the substrate cover portion in the outward direction and exposes the third pad region in the outward direction, when viewed in the outward direction, and a third groove that passes through a portion overlapping the fourth pad region in the substrate cover portion in the outward direction and exposes the fourth pad region in the outward direction, when viewed in the outward direction thereof.

In yet another aspect, a shape connecting edge portions of the pad regions may be a quadrangle when the pad regions are viewed in the outward direction thereof.

In yet another aspect, the plurality of pad regions may be formed and the plurality of protrusion members may be formed, and Lengths of the plurality of protrusion members in the outward direction may correspond to each other.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

4

Figure 1:
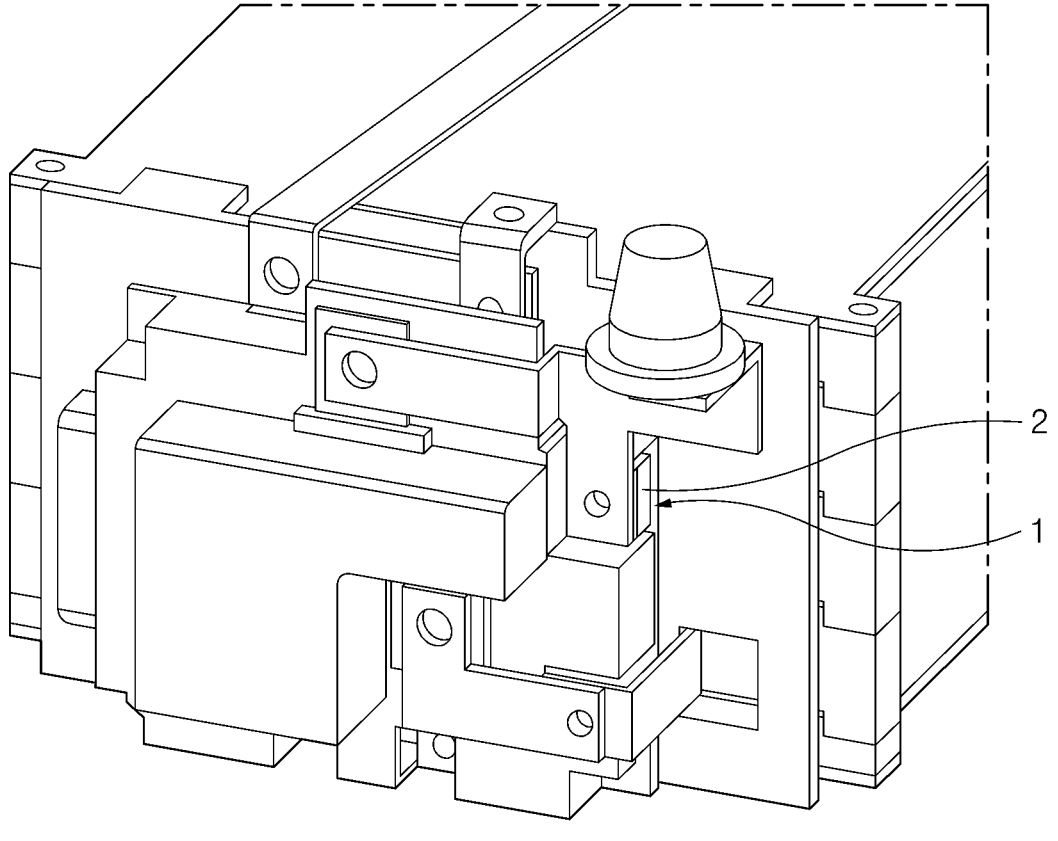
FIG. 1 is a view exemplarily illustrating a battery assembly according to the related art.
Figure 2:
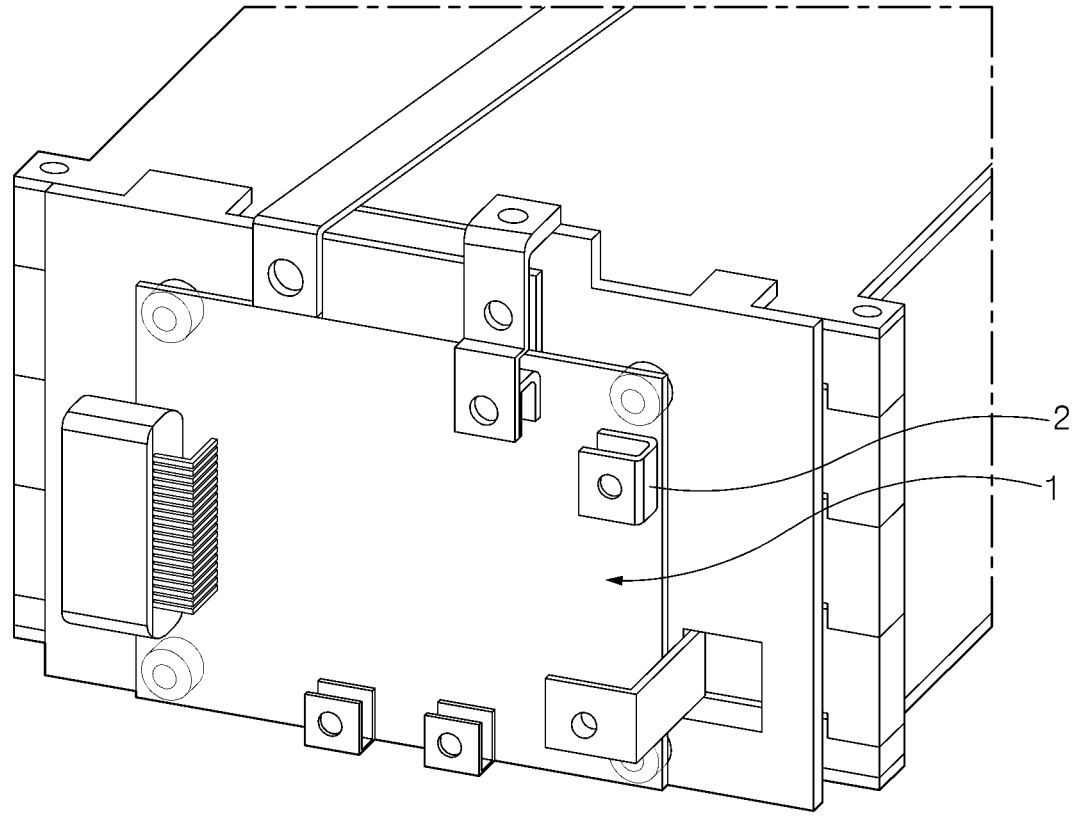
FIG. 2 is a view exemplarily illustrating a side of the substrate portion in the battery assembly according to the related art.
Figure 3:
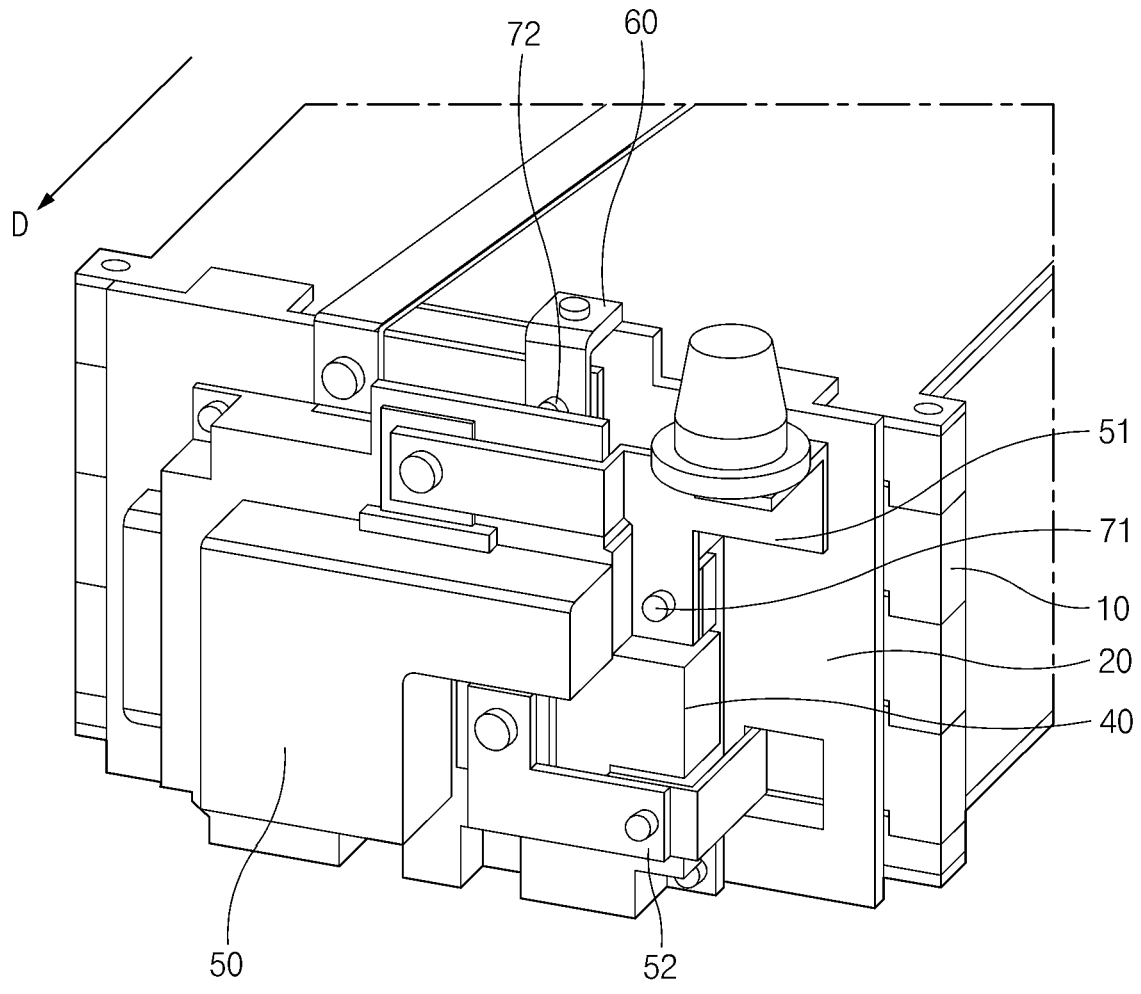
FIG. 3 is a view exemplarily illustrating a battery assembly according to an exemplary embodiment of the present disclosure.
Figure 6:
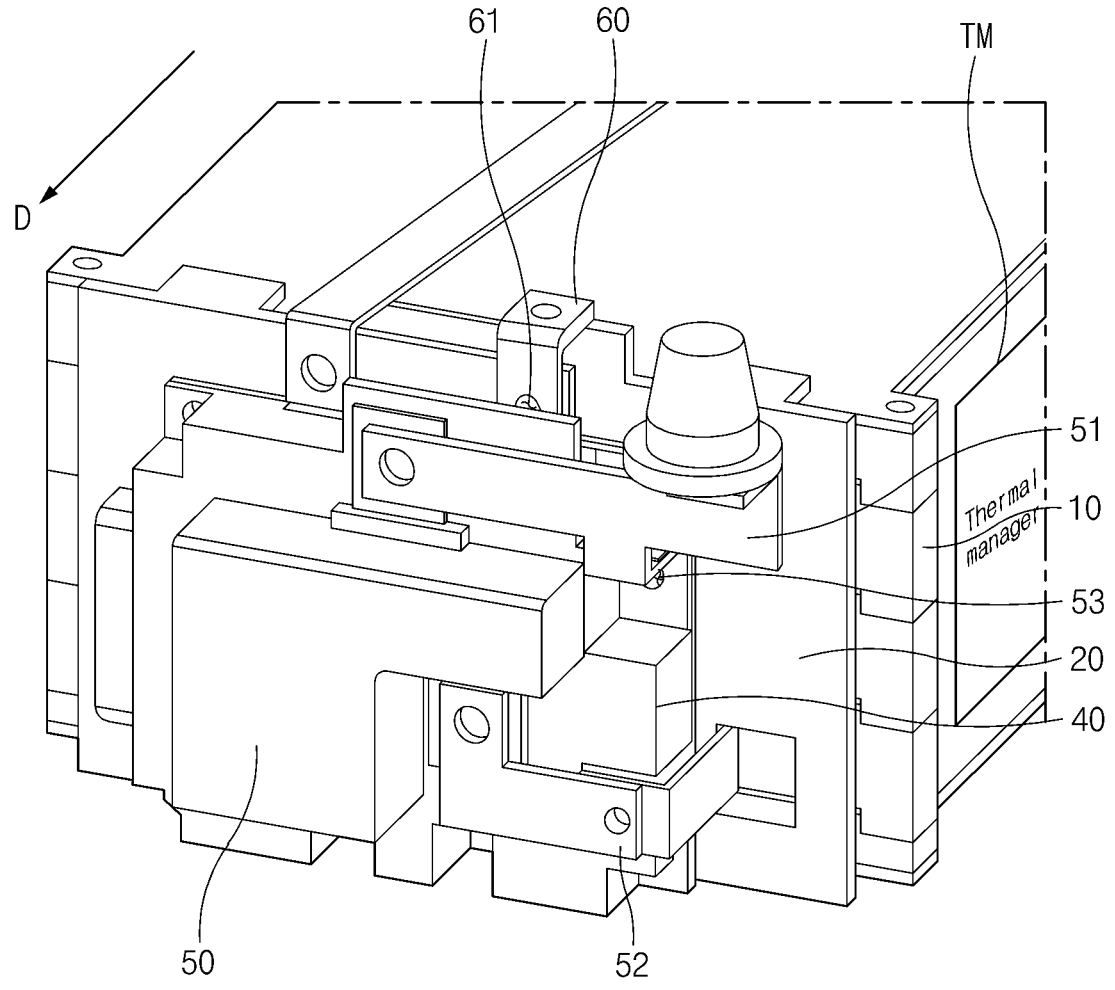

FIG. 6 is a view exemplarily illustrating the battery assembly according to the exemplary embodiment of the present disclosure in a state in which a fastening member is removed from FIG. 3.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. When components in the drawings are designated by reference numerals, the same components have the same reference numerals as far as possible even though the components are illustrated in different drawings. Furthermore, in describing the exemplary embodiment of the present disclosure, a detailed description of the related known configuration or function will be omitted when it is determined that the detailed description interferes with the understanding of the exemplary embodiment of the present disclosure.

Figure 4:
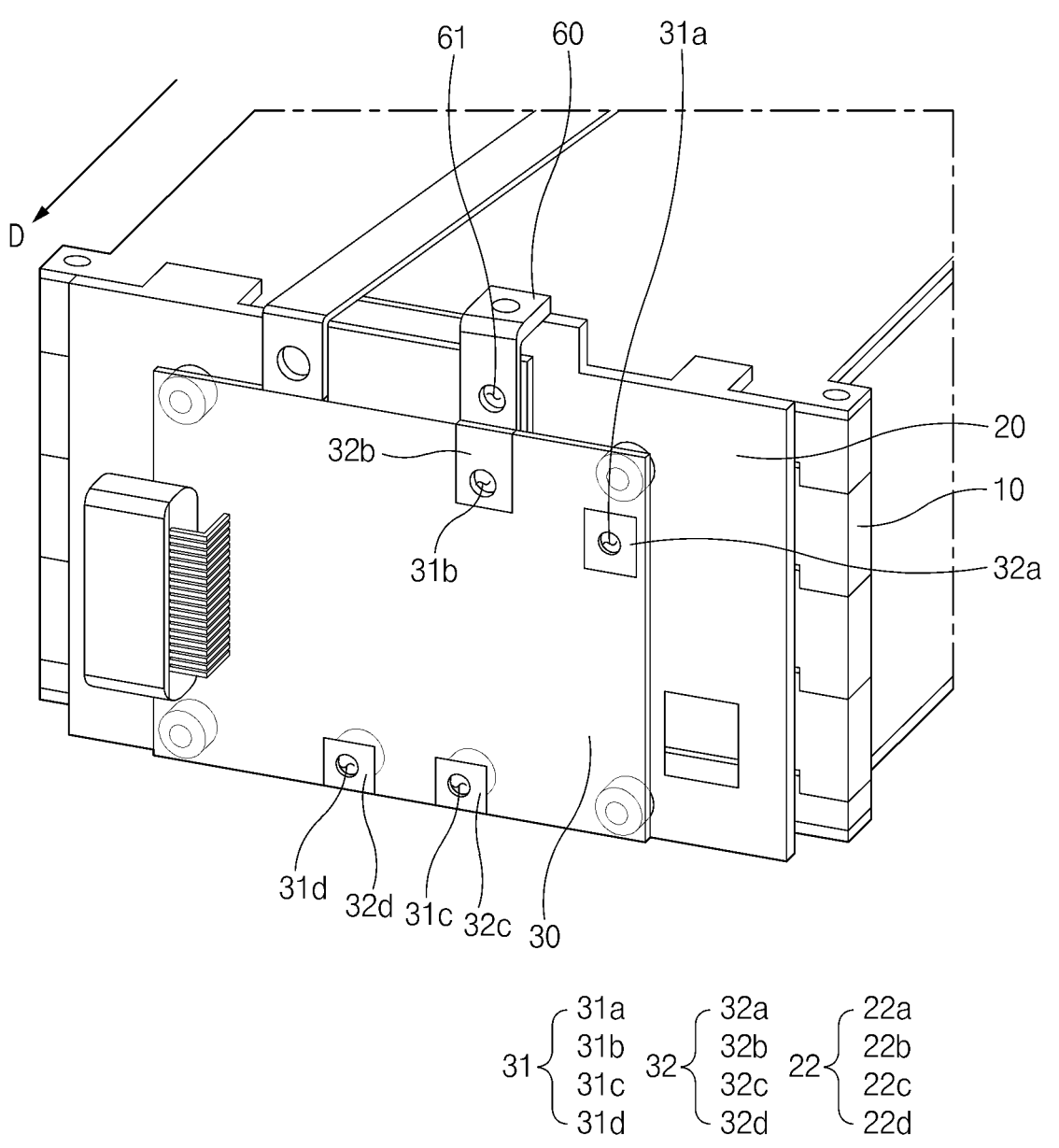
FIG. 4 is a view exemplarily illustrating a side of a substrate portion of the battery assembly according to the exemplary embodiment of the present disclosure.
Figure 5:
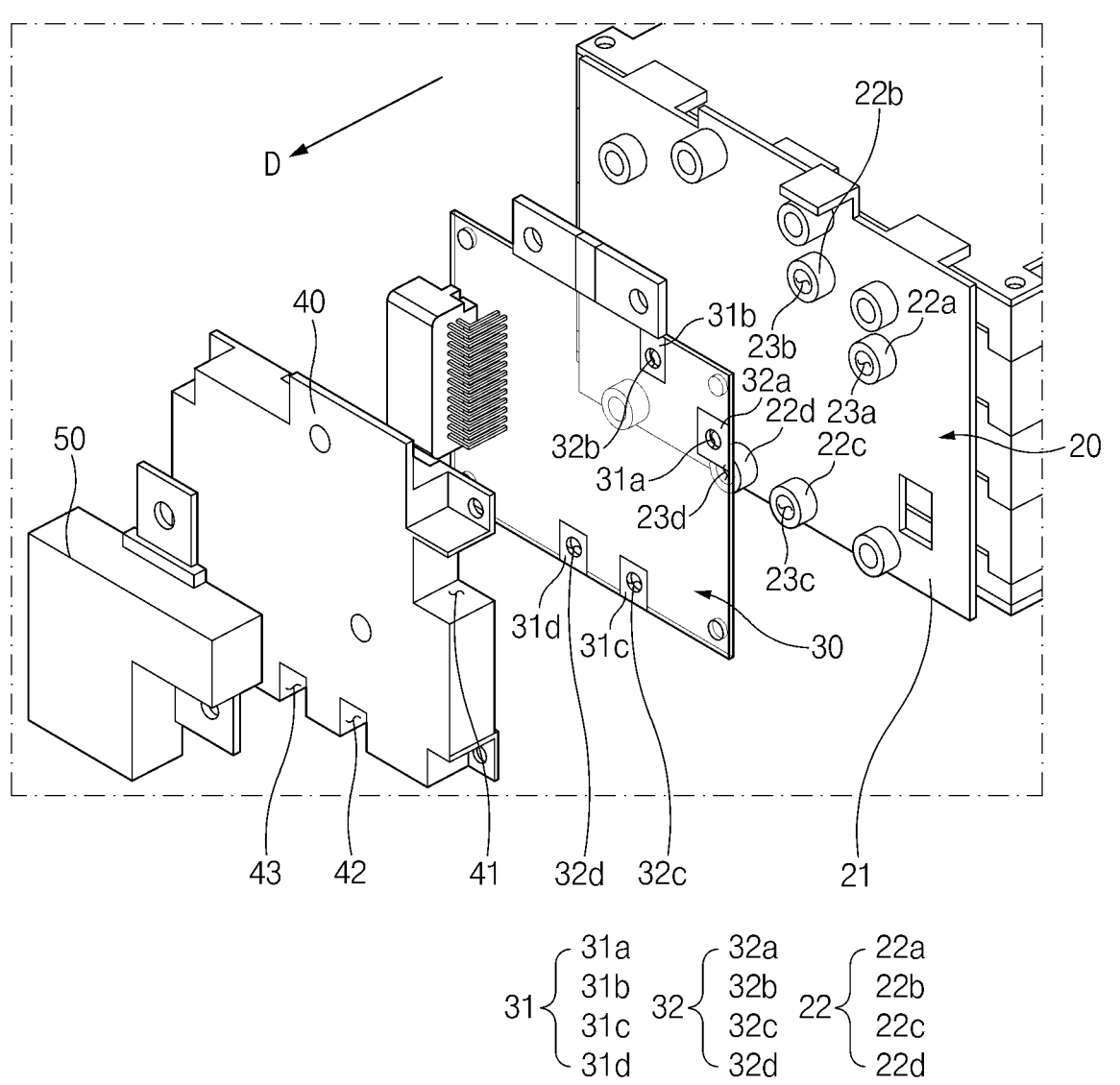
FIG. 5 is an exploded perspective view exemplarily illustrating a cover portion, the substrate portion, a substrate cover portion, and a latch relay of the battery assembly according to the exemplary embodiment of the present disclosure.

FIG. 3 is a view exemplarily illustrating a battery assembly according to an exemplary embodiment of the present disclosure. FIG. 4 is a view exemplarily illustrating a side of a substrate portion of the battery assembly according to the exemplary embodiment of the present disclosure. FIG. 5 is an exploded perspective view exemplarily illustrating a cover portion, the substrate portion, a substrate cover portion, and a latch relay of the battery assembly according to the exemplary embodiment of the present disclosure. FIG. 6 is a view exemplarily illustrating the battery assembly according to the exemplary embodiment of the present disclosure in a state in which a fastening member is removed from FIG. 3.

The battery assembly according to the exemplary embodiment of the present disclosure may include a battery module stack, a cover portion 20, and a substrate portion 30. At least one battery module 10 may be stacked and formed in the battery module stack. The battery module 10 may be surrounded by a flame retardant material.

The cover portion 20 may be coupled to one side of the battery module stack. The substrate portion 30 may be coupled to an external surface of the cover portion 20. Here, an outward direction D may be a direction from the battery module stack to the cover portion 20.

Components for preventing accidents of the battery module stack may be electrically connected to the substrate portion 30. A connector for receiving an external electrical signal may be coupled to the substrate portion 30. The substrate portion 30 may be treated using a solder mask.

The cover portion 20 may include a cover member 21 and a protrusion member 22. The cover member 21 may be coupled to the battery module stack. The protrusion member 22 may protrude from the cover member 21 toward the outward direction D and may be in contact with the substrate portion 30.

The substrate portion 30 may include an overlapping region. The overlapping region may be a region overlapping the protrusion member 22 when viewed in the outward direction D. A through-hole 31 passing through the overlapping region in the outward direction D may be formed in the overlapping region.

A pad region 32 may be formed in a region of surrounding the through-hole 31 in the substrate portion 30. The pad region 32 may have an electrically conductive property. The pad region 32 may be electrically connected to a bus bar or a ring terminal wire. The pad region 32 may be a region of the substrate portion 30, which is not covered with a solder mask. As an exemplary embodiment of the present disclosure, when the pad region 32 is viewed in the outward direction D, a shape connecting edge portions of the pad region 32 may be a quadrangular shape.

The plurality of pad regions 32 may be formed, and the plurality of protrusion members 22 may be formed. In the instant case, lengths of the plurality of protrusion members 22 in the outward direction D may correspond to each other. Some protrusion members 22 among the protrusion members 22 may be fastened to the substrate portion 30 to serve to fix the substrate portion 30 to the cover portion 20.

According to an exemplary embodiment of the present disclosure, because the substrate portion 30 and the components may be connected through the pad region 32 of the substrate portion 30 without a terminal block structure protruding outward, structural stability may be reinforced. Furthermore, according to an exemplary embodiment of the present disclosure, because the components may be directly connected to the substrate portion 30 through direct contact without a separate terminal block, production costs may be reduced as compared to a case in which the separate terminal block is manufactured.

The battery assembly according to the exemplary embodiment of the present disclosure may further include a substrate cover portion 40 and a latch relay 50. The substrate cover portion 40 may be coupled to an external side of the substrate portion 30. The substrate cover portion 40 may prevent the substrate portion 30 from being exposed in the outward direction D. The latch relay 50 may be coupled to an external side of the substrate cover portion 40. The latch relay 50 is configured to block a circuit to protect a battery system when various failures occur in the battery.

The battery assembly according to the exemplary embodiment of the present disclosure may further include a latch relay input bus bar 51 electrically connected to the latch relay 50. Furthermore, the battery assembly may further include a latch relay output bus bar 52 electrically connected to the latch relay 50. The latch relay output bus bar 52 may be connected to the battery module assembly.

The overlapping region may include a first overlapping region to be connected to the latch relay 50. A first through-hole 31a passing through the first overlapping region in the outward direction D may be formed in the first overlapping region. Furthermore, a first pad region 32a in contact with the latch relay input bus bar 51 may be formed in a region surrounding the first through-hole 31a in the substrate portion 30.

When viewed in the outward direction D, a first connection hole 53 communicating with the first through-hole 31a may be formed in a portion overlapping the first overlapping region in the latch relay input bus bar 51. Furthermore, a first opening 23a communicating with the first through-hole 31a and opened in the outward direction D may be formed in a first protrusion member 22a which is the protrusion member 22 overlapping the first overlapping region in the protrusion members 22.

In the instant case, the battery assembly according to the exemplary embodiment of the present disclosure may include a first fastening member 71. The first fastening member 71 may pass through the first connection hole 53 and the first through-hole 31a and may be inserted into the first opening 23a to fasten the latch relay input bus bar 51, the substrate portion 30, and the cover portion 20 to each other. As an exemplary embodiment of the present disclosure, the first fastening member 71 may be a bolt. In the instant case, the first protrusion member 22a in which the first opening 23a is formed is configured as a kind of nut. To the present end, a screw thread may be formed inside the first protrusion member 22a.

Meanwhile, a first groove 41 may be formed in the substrate cover portion 40. When viewed in the outward direction D, the first groove 41 may pass through a portion overlapping the first pad region 32a in the substrate cover portion 40 in the outward direction D. The first pad region 32a may be exposed in the outward direction D through the first groove 41 and in contact with the latch relay input bus bar 51.

The battery assembly according to an exemplary embodiment of the present disclosure may further include a ground portion 60 for grounding the substrate portion 30.

The overlapping region may include a second overlapping region to be electrically connected to the ground portion 60. A second through-hole 31b passing through the second overlapping region in the outward direction D may be formed in the second overlapping region, and a second pad region 32b in contact with the ground portion 60 may be formed in a region surrounding the second through-hole 31b in the substrate portion 30.

When viewed in the outward direction D, a second connection hole 61 communicating with the second through-hole 31b may be formed in a portion overlapping the second overlapping region in the ground portion 60. Furthermore, a second opening 23b communicating with the second through-hole 31b and opened in the outward direction D may be formed in a second protrusion member 22b which is the protrusion member 22 overlapping the second overlapping region in the protrusion members 22.

In the instant case, the battery assembly according to the exemplary embodiment of the present disclosure may include a second fastening member 72. The second fastening member 72 may pass through the second connection hole 61 and the second through-hole 31b and may be inserted into the second opening 23b to fasten the ground portion 60, the substrate portion 30, and the cover portion 20 to each other. The second fastening member 72 may be a bolt. In the instant case, the second protrusion member 22b in which the second opening 23b is formed is configured as a kind of nut. To the present end, a screw thread may be formed inside the second protrusion member 22b.

The battery assembly according to the exemplary embodiment of the present disclosure may further include a thermal manager (TM) which is electrically connected to the battery module 10 and manages heat of the battery module 10. In the instant case, the overlapping region may include a third overlapping region and a fourth overlapping region.

The third overlapping region may be a region to be connected to a positive electrode terminal of the thermal manager (TM). A third through-hole 31*c* passing through the third overlapping region in the outward direction D may be formed in the third overlapping region. A third pad region 32*c* may be formed in a region surrounding the third through-hole 31*c* of the substrate portion 30. The third pad region 32*c* may be a region to be in contact with the ring terminal wire connected to the thermal manager (TM).

Furthermore, a third opening 23*c* communicating with the third through-hole 31*c* and opened in the outward direction D may be formed in a third protrusion member 22*c* which is the protrusion member 22 overlapping the third overlapping region in the protrusion members 22.

The fourth overlapping region may be a region to be connected to a negative electrode terminal of the thermal manager (TM). A fourth through-hole 31*d* passing through the fourth overlapping region in the outward direction D may be formed in the fourth overlapping region. A fourth pad region 32*d* may be formed in a region surrounding the fourth through-hole 31*d* of the substrate portion 30. The fourth pad region 32*d* may be a region to be in contact with the ring terminal wire connected to the thermal manager (TM).

Furthermore, a fourth opening 23*d* communicating with the fourth through-hole 31*d* and opened in the outward direction D may be formed in a fourth protrusion member 22*d* which is the protrusion member 22 overlapping the fourth overlapping region in the protrusion members 22.

A second groove 42 and a third groove 43 may be formed in the substrate cover portion 40. When viewed in the outward direction D, the second groove 42 may pass through a portion overlapping the third overlapping region in the substrate cover portion 40 in the outward direction D. The third pad region 32*c* may be exposed in the outward direction D through the second groove 42.

When viewed in the outward direction D, the third groove 43 may pass through a portion overlapping the fourth pad region 32*d* in the substrate cover portion 40 in the outward direction D. The fourth pad region 32*d* may be exposed in the outward direction D through the third groove 43.

According to an exemplary embodiment of the present disclosure, because components may be connected to a substrate portion without a terminal block structure protruding outward, structural stability may be reinforced.

Furthermore, according to an exemplary embodiment of the present disclosure, because the components may be directly connected to the substrate portion through direct contact without a separate terminal block, production costs may be reduced.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A battery assembly comprising:
a battery module stack in which at least one battery module is stacked;
a cover portion coupled to a side of the battery module stack; and
a substrate portion coupled to an external surface of the cover portion,
wherein the cover portion includes:
a cover member coupled to the battery module stack; and
a protrusion member protruding in an outward direction from the cover member and in contact with an internal surface of the substrate portion,
wherein the substrate portion includes an overlapping region which is a region overlapping the protrusion member when viewed in the outward direction,
wherein a through-hole passing through the overlapping region in the outward direction is formed in the overlapping region, and
wherein a pad region having electrically conductive properties is formed in a region surrounding the through-hole in the substrate portion.

2. The battery assembly of claim 1, further including:
a substrate cover portion coupled to an external side of the substrate portion; and
a latch relay coupled to an external side of the substrate cover portion.

3. The battery assembly of claim 2, further including:
a latch relay input bus bar electrically connected to the latch relay,
wherein the overlapping region includes a first overlapping region to be connected to the latch relay,
wherein the through-hole includes a first through-hole passing through the first overlapping region in the outward direction and formed in the first overlapping region, and
wherein the pad region includes a first pad region configured to be in contact with the latch relay input bus bar and formed in a region surrounding the first through-hole in the substrate portion.

4. The battery assembly of claim 3,
wherein a first connection hole communicating with the first through-hole is formed in a portion overlapping the first overlapping region in the latch relay input bus bar, when viewed in the outward direction,
wherein the protrusion member includes a first protrusion member, and a first opening communicating with the first through-hole and opened in the outward direction is formed in the first protrusion member overlapping the first overlapping region, and
wherein the battery assembly further includes a first fastening member passing through the first connection hole and the first through-hole and inserted into the first opening to fasten the latch relay input bus bar, the substrate portion, and the cover portion to each other.

5. The battery assembly of claim 3, wherein a first groove passing through a portion overlapping the first pad region in the substrate cover portion in the outward direction and exposing the first pad region in the outward direction is formed in the substrate cover portion, when viewed in the outward direction thereof.

6. The battery assembly of claim 1, further including:
a ground portion configured to ground the substrate portion,
wherein the overlapping region includes a second overlapping region to be electrically connected to the ground portion,
wherein the through-hole includes a second through-hole passing through the second overlapping region in the outward direction is formed in the second overlapping region, and
wherein the pad region includes a second pad region configured to be in contact with the ground portion is formed in a region surrounding the second through-hole in the substrate portion.

7. The battery assembly of claim 6,
wherein a second connection hole communicating with the second through-hole is formed in a portion overlapping the second overlapping region in the ground portion when viewed in the outward direction,
wherein the protrusion member includes a second protrusion member, and a second opening communicating with the second through-hole and opened in the outward direction is formed in the second protrusion member overlapping the second overlapping region, and
wherein the battery assembly further includes a second fastening member passing through the second connection hole and the second through-hole and inserted into the second opening to fasten the ground portion, the substrate portion, and the cover portion to each other.

8. The battery assembly of claim 1, further including:
a thermal manager electrically connected to the battery module and configured to manage heat of the battery module,
wherein the overlapping region includes:
    a third overlapping region to be connected to a positive electrode terminal of the thermal manager; and a fourth overlapping region to be connected to a negative electrode terminal of the thermal manager,
wherein the through-hole includes:
    a third through-hole passing through the third overlapping region in the outward direction and formed in the third overlapping region; and
    a fourth through-hole passing through the fourth overlapping region in the outward direction and formed in the fourth overlapping region,
wherein the pad region includes:
    a third pad region formed in a region surrounding the third through-hole of the substrate portion, and
    a fourth pad region formed in a region surrounding the fourth through-hole of the substrate portion.

9. The battery assembly of claim 8, further including:
a substrate cover portion coupled to an external side of the substrate portion,
wherein the substrate cover portion includes:
    a second groove passing through a portion overlapping the third pad region in the substrate cover portion in the outward direction and configured to expose the third pad region in the outward direction, when viewed in the outward direction; and
    a third groove passing through a portion overlapping the fourth pad region in the substrate cover portion in the outward direction and configured to expose the fourth pad region in the outward direction, when viewed in the outward direction.

10. The battery assembly of claim 1, wherein a shape connecting edge portions of the pad region is a quadrangle when the pad region is viewed in the outward direction.

11. The battery assembly of claim 1,
wherein the pad region is in plural and the protrusion member is in plural, and
wherein lengths of the plurality of protrusion members in the outward direction correspond to each other.

12. The battery assembly of claim 11, further including:
a substrate cover portion coupled to an external side of the substrate portion,
wherein a groove passing through a portion overlapping one of the pad regions in the substrate cover portion in the outward direction and exposing the one pad region in the outward direction is formed in the substrate cover portion, when viewed in the outward direction.

\* \* \* \* \*